United States Patent [19]

Weiss et al.

[11] 4,049,628

[45] Sept. 20, 1977

[54] POLYESTERS AND PROCESS FOR THEIR PREPARATION

[75] Inventors: Jean Weiss, Moval; Alain Zalmanski, Chantilly, both of France

[73] Assignee: Produits Chimiques Ugine Kuhlmann, Paris, France

[21] Appl. No.: 330,117

[22] Filed: Feb. 6, 1973

[30] Foreign Application Priority Data

Jan. 12, 1972 France .................................. 72.00903

[51] Int. Cl.$^2$ .............................................. C08G 63/54
[52] U.S. Cl. ............................ 260/47 UA; 260/75 H;
260/869
[58] Field of Search ................ 260/869, 47 UA, 47 C,
260/75 N, 75 H

[56] References Cited

U.S. PATENT DOCUMENTS

| | | | |
|---|---|---|---|
| 3,102,105 | 8/1963 | Collardeau et al. | 260/45.4 |
| 3,303,240 | 2/1967 | Szobel et al. | 260/869 |
| 3,361,847 | 1/1968 | Zimmermann et al. | 260/864 |
| 3,373,144 | 3/1968 | Janssen et al. | 260/75 |
| 3,720,721 | 3/1973 | Becker et al. | 260/620 |

OTHER PUBLICATIONS

Chem. Abstracts 62, 11936g (1965).
Chem. Abstracts 65, 4035b (1966).
Boenig, "Unsaturated Polyesters", pp. 9, 10, 35, 36 & 102–105; Elsevier 1964.

*Primary Examiner*—Harold D. Anderson
*Assistant Examiner*—E. A. Nielsen
*Attorney, Agent, or Firm*—Pennie & Edmonds

[57] ABSTRACT

Unsaturated polyesters are disclosed which are obtained from $\alpha,\beta$-unsaturated diacids of the cis form and polyols derived from polyhalogenated, polysubstituted polyphenyls. At the end of the esterification reaction, these polyesters possess from about 60 to 98% trans acid groups and from about 40 to 2% cis acid groups. The use of these polyesters in the preparation of various articles is also disclosed.

1 Claim, No Drawings

POLYESTERS AND PROCESS FOR THEIR PREPARATION

BACKGROUND OF THE INVENTION

I. Field of the Invention

This invention relates to unsaturated polyesters, their preparation and the use of the unsaturated polyesters in the manufacture of various articles.

II. Description of the Prior Art

In commonly assigned French Pat. No. 1,336,751 of July 12, 1962 and corresponding U.S. Pat. No. 3,303,240 issued Feb. 7, 1967, colleagues of the inventors herein have disclosed self-extinguishing polyesters obtained from the esterification of polyols derived from NN' substituted polyhalogenated diphenyls and the copolymers prepared from these polyesters. The primary interest of these products now commercially supplied under the trade names ERVAPON and ERVADIOL by Societe Plastimer lies in their excellent self-extinguishing characteristics which are due to the presence of halogen atoms substituted upon the phenyl radicals of the diol. These products are also of interest for their good resistance to corrosion from such reactant chemicals as acids and bases. On the contrary, their resistance to solvents, and in particular chlorinated solvents, is not always sufficient even though they are clearly better in this respect than known and conventional polyesters obtained from diols having relatively short chains.

Subsequent studies carried out by the inventors with polyesters derived from maleic acid according to this patent have shown that in addition to maleic groups, there is also a small amount of fumaric groups present, on the order of from 20 to 30% according to measurements carried out by means of nuclear magnetic resonance techniques. These fumaric groups result from the partial isomerization of the unsaturated acid in the course of the esterification reaction.

It has already been pointed out in the literature, in particular, in French Pat. No. 1,392,411, that the polyesters derived from the reaction of aliphatic polyols with maleic anhydride, an anhydride employed alone or in mixture with other anhydrides or acids is presently the most utilized diacid for the preparation of polyesters, can be converted into polyesters of improved properties by isomerization in situ of the maleic into the fumarate. This was not surprising since it was also known that the esters of fumaric acid provide superior properties to the maleic homologues. However, the commercial use of fumaric acid for the preparation of polyesters is limited due to the price of this material (fumaric acid is generally prepared from maleic acid), the yield of esterification is relatively low and above all, due to the operational difficulties resulting from the higher melting point of fumaric acid.

In the case of known polyesters, the isomerization of the maleate into the fumarate can be accomplished by means of various known and conventional processes, for example, by the action of bromine under the influence of light or by the use of iodine or sulfur as a catalyst. However, according to French patent 1,392,411, the process which provides the best results is that which comprises utilizing secondary cyclic amines as catalysts. These catalysts simultaneously accelerate esterification and isomerization. Piperidine and its derivatives have been found to be particularly advantageous for this purpose.

SUMMARY OF THE INVENTION

Polyesters derived from $\alpha, \beta$-unsaturated diacids and polyols derived from polysubstituted, polyhalogenated polyphenyls comprising from about 60 to 90% fumaric groups, advantageously from about 90 to 98% fumaric groups and from about 40 to 2% maleic groups, advantageously from about 10 to 2% maleic groups, have been prepared. These polyesters demonstrate excellent resistance to highly corrosive environments.

It was completely unforeseen and unexpected that the polyesters of this invention would be stable under the conditions noted hereinafter to all the chemical media and solvents studied. Known and conventional corrosion-resistant polyesters do not simultaneously demonstrate thermal stability, self-extinguishing properties and resistance to comparably high levels of corrosion as do the polyesters herein.

The polyesters of this invention can be prepared by any one of several known and conventional polyesterification processes employing polyols and polyacids and in particular, by melt or solvent esterification processes which can be conducted in batch or continuously with any appropriate apparatus.

Systematic experiments carried out with various isomerization catalysts cited in the literature, namely, iodine, sulfur and its derivatives such as thiourea, 2-mercaptothiozaline and mercaptobenzimidazole, methylpiperidine and piperidine have shown that the best results were obtained with piperidine at a level of 1% of the polyester prepared. However, the preparation of polyesters according to the invention can also be suitably carried out using any other catalyst which results in the desired degree of isomerization of maleate into fumarate.

Examples of polyols which have been found to be useful for preparing the polyesters of this invention include the polyols derived from the polysubstituted, polyhalogenated polyphenols of the general formula:

$$\text{Ar} [\text{A} - \text{R (OH)}_{n-1}]_m \qquad (I)$$

wherein Ar is a polyvalent radical of valence $m$ derived from a polyphenyl or polyhalogenated polyphenyl, A is oxygen, sulfur on a divalent radical —$NR_1$— in which $R_1$ is a hydrogen atom or an alkyl or aryl radical and R is a hydrocarbon radical of valence $n$ and:

i. when $n$ is 2, $m$ is greater than 1 except when $n$ and $m$ are 2 and when Ar represents a perchlorinated diphenyl radical; and ii. when $n$ is greater than 2, $m$ is equal to or greater than 1.

The polyols obtained from the condensation of decachlorodiphenyl with aliphatic aminoalcohols or glycols, in particular, with NN' bis (ethan-2-ol) diamino-octochlorodiphenyl which results from the reaction of decachlorodiphenyl with monoethanolamine and with bis-tetrachlorophenoxyethoxyethanol which results from reaction of decachlorodiphenyl with diethyleneglycol, are especially advantageous. To prepare the polyesters of this invention, the polyols of formula (I), for example, can be used either alone or in mixture with polyols which are commonly employed in the preparation of polyesters, for example, ethyleneglycol, diethyleneglycol, triethyleneglycol, tetraethyleneglycol, 1,2-propanediol, 1,3-propanediol, 2,2-dimethylpropane-1,3-diol, 1,3-butanediol, 1,4-butanediol, 1,5-pentanediol, 1,6-hexanediol, glycerol, trimethylolpropane and pentaerythritol.

Maleic acid or its anhydride is the main diacid employed herein, but one can also use their transesterifiable derivatives, for example, their dimethyl or diethyl esters. Part of the maleic acid can also be replaced with chloromaleic acid, citraconic acid, itaconic acid or any other unsaturated diacid.

To prepare the polyesters of this invention, the above-cited acids can be employed either alone or in mixture with saturated acids such as phthalic, isophthalic, adipic, succinic, tetrahydrophthalic or hexachloroendomethylenetetrahydrophthalic acid.

The present invention also relates to copolymerizable compositions or diluted resins containing the polyesters herein as well as the resulting copolymers.

The monomers which along with the polyesters herein are useful for preparing the copolymers of the invention can be any copolymerizable compositions possessing a double bond, as for example, styrene and diallyl phthalate.

The polyesters and copolymers of this invention are of particular interest because they simultaneously demonstrate excellent thermal stability, self-extinguishing properties and resistance to corrosion and chlorinated solvents. These properties are particularly well-adapted to the preparation of coated articles such as industrial kettles, electrically charged or neutral moldings such as articles used in the electronic industries, varnishes, cements and coated surface generally.

The following examples illustrate the polyesters of this invention, their manner of preparation, and their properties when compared to the properties of polyesters obtained from nonisomerized maleic anhydride or fumaric anhydride.

EXAMPLE 1

Three polyesters were prepared according to this invention in addition to three copolymers of these polyesters using styrene as the monomer. The following chlorinated diols were employed:

(1.1) NN'Bis(ethan-2-ol) diamino-octachlorodiphenyl, the product obtained from the reaction of decachlorodiphenyl with monoethanolamine.

(1.2.) bis tetrachlorophenoxyethoxyethanol, the product obtained from the reaction of decachlorodiphenyl with diethyleneglycol.

(1.3.) the diol obtained from the reaction of decachlorodiphenyl with polyethyleneglycol having a molecular weight of 300 and supplied under the trade name EMKAPOL 300 by Societe des Produits Chimiques Ugine Kuhlmann. The process for preparing these polyesters was in all cases as follows:

1.1 moles of chlorinated diol were charged into a reactor of appropriate volume equipped with recycling means and heated under a stream of nitrogen. When the product had melted, from 5 to 10% xylene was added as a solvent to entrain the water, 1% piperdine as the isomerization catalyst and 1 mole of maleic anhydride. The temperature climbed steadily up to 150°–160° C while refulx of the xylene into a decanter was maintained. Esterification was stopped when the acid value reached 40-45. While heating was maintained, the azeotropic column was short circuited to proceed to the direct elimination of xylene by simple distillation. Distillation was discontinued when the acid value reached 35. The residual xylene was eliminated by subjecting the material to a vacuum at 160° C and the vacuum was discontinued when the acid value reached from 20-25. Thereafter 100 ppm of hydroquinone were added as an inhibitor and the product diluted with styrene in such a way as to provide a copolymer in the form of a 65 to 55% dry extract having a viscosity at 25° C of between 350 and 500 centipoises, such values being necessary for the use of the copolymer in contact molding.

The degree of isomerization of maleic configuration to fumaric configuration as measured by nuclear magnetic resonance for each polyester was as follows:

| Diol | Degree of Isomerization of Polyester in % |
|---|---|
| (1.1.) NN' bis (ethan-2-ol) diaminooctachlorodiphenyl | 94 |
| (1.2.) bis tetrachlorophenoxyethoxyethanol | 95 |
| (1.3.) decachlorodiphenyl + polyethyleneglycol 300 | 94 |

EXAMPLE 2

By way of comparison, there was prepared according to the process described in EXAMPLE 1.

(2.1.) a maleate polyester of NN'bis (ethan-2-ol) diaminooctachlorodiphenyl without the addition of an isomerization catalyst (the polyester thus obtained had a degree of isomerization as measured by nuclear magnetic resonance of 30% in contrast to 94% for the polyester (1.1) above);

(2.2.) a fumarate polyester of NN'bis (ethan-2-ol) diaminooctachlorodiphenyl from the esterification of this diol with fumaric acid. From these two polyesters (2.1) and (2.2) copolymers (2.1) and (2.2) were prepared with styrene monomer under substantially the same conditions described for EXAMPLE 1.

Comparative tests were carried out with copolymers (1.1) the isomerized maleate, (2.1) the non-isomerized maleate and (2.2), the fumarate. Plates 3 mm in thickness were prepared from these three copolymers by pressing the copolymers at ambient temperature with 2% of a 50% solution of methylethylketone peroxide solution in dibutyl phthalate and 3% naphthenate cobalt containing 0.4% metal. After 24 hours at ambient temperature the plates were reheated for 16 hours at 60° C and then formed into cylinders measuring 40 × 40 × 3 mm. The cylinders were placed in hermetically sealed flasks containing 250 cm³ of various reagents in such a way that the cylinders were completely covered.

The following tests were carried out upon these cylinders to determine their resistance to chemical attack:

1. The percentage by weight of absorbed material or swelling, measured by weighing the cylinders before and after the test;

2. the loss in weight or the percentage of desorbed material obtained by an additional weighing of the cylinders after heating at 85° C up to constant weight; and 3. the reduction in Barcol hardness. This involved a measurement of surface hardness which was expressed in arbitrary units of 0 to 100. The BARCOL-IMPRESSOR apparatus model 934, described in U.S. Pat. No. 2,372,662 and manufactured by BARBER-COLLMAN Company Rockford-Illinois (U.S.A.) was employed.

Reduction in mechanical strength after Dynstat flexion was measured according to recommendation 11-60 of the Centre d'Etudes des Matieres Plastiques.

The reagents employed in the tests were a 20% solution of sodium hydroxide at 85° C, 25% sulfuric acid at 85° C, 10% acetic acid at 85° C, pure ethanol at 40° C, 50% acetone at 40° C, monochlorobenzene at 40° C and a 50—50 mixture of trichloroethylene and xylene at 40° C.

Table I hereinbelow sets forth the esterification conditions and the physical and chemical characteristics of the polyester resins, the diluted resins and the copolymerizates (1.1), (2.1) and (2.2) and Table II reports the corrosion resistance of copolymerizates (1.1), (2.1) and (2.2).

Analysis of the results set forth in these tables demonstrate the great interest of the polyesters of this invention which simultaneously facilitate processing of the maleates and offer improved performance for applications of the fumurates.

TABLE 1

The esterification conditions and the physical and chemical properties of polyesters derived from NN' bis (ethan-2-ol) diamino-octachloro diphenyl, (1.1) maleate isomerized with 1% piperidine, the (2.1) maleate without piperidine and the (2.2) fumarate are set forth:

| (1.1.) POLYESTERS (or RESIN MASSES) | | | |
|---|---|---|---|
| | (1.1) | (2.1) | (2.2) |
| Total time for esterification to attain an acid index of 20 to 25. | 5 to 6 hrs. | 7 to 8 hrs. | 15 to 18 hrs. |
| Esterification temperature | 155°–165° C | 155°–165° C | 175°–185° C |
| Acid index. | 23 | 18 | 23 |
| Nourylande viscosity at 160° C in poises (*). | 105 | 115 | not measureable, too high. |
| Nourylande viscosity at 100° C with an 80% dry extract in styrene in poises. | 6 | 7 | 14 |

*The elasped time for a steel billet of 2mm diameter to descend 10.4 cm between two marks was measured in a test tube of 50 mm diameter containing the resin. One second was equivalent to 1 poise.

| (1.2) DILUTED RESINS (or COPOLYMERIZABLE MIXTURES) | | | | |
|---|---|---|---|---|
| | | (1.1) | (2.1) | (2.2) |
| Dry extract % of diluted resin. | | 58% | 57.5% | 57% |
| Viscosity 25° C in cP | | 370 | 490 | 470 |
| Acid index | | 12.5 | 9 | 13 |
| Reacting at cool temperature(**) | Gelling time | 12.30 min. | 16.30 min. | 30 min. |
| | Exothermic peak | 154° C | 157° C | 135° C |
| | Duration of polymerization | 30 min. | 37 min. | 68 min. |

(**)These measurements were made at 20° C with the following catalyst-system:
1) catalyst 1% of a 50% methylethylketone peroxide solution.
2) accelerator: 0.3% of a 6% solution of sodium naphthenate.

50 grams of resin were weighed in a previously tared 100 mm beaker with its agitator and to which was added 0.15 ml of the naphthenate solution withdrawn with a precision pipette. The mixture was stirred to disperse the accelerator and immersed for 15 minutes in a thermostatically controlled bath at 20° C to equilibrate the temperature. 0.5 ml of 50% methylethylketone peroxide were then added and the time measured. The mixture was hand-stirred until gelling occurred. The time required for gelling to take place corresponded to the moment when the resin no longer flowed the length of the agitator in a stream. After obtaining the gel, the beaker was withdrawn from the bath and left an ambient température for the determination of polymerization time noted when the resin separated from the vessel.

| (1.3) COPOLYMERIZATES | | | |
|---|---|---|---|
| | (1.1) | (2.1) | (2.2) |
| Temperatures of distortion under load-AFNOR test T 51.005 | 134° C | 112° C | 136° C |

TABLE II

Resistance of the Copolymerizates to Solvents and Chemical Reagents After One Month of Corrosive Attack

| Solvents | | NaOH at 20% | H$_2$SO$_4$ at 25% | CH$_3$CO$_2$H at 10% | C$_2$H$_5$OH pure | (CH$_3$)$_2$CO at 50% | C$_6$H$_4$Cl pure | C$_6$H$_4$Cl/C Cl$_3$H |
|---|---|---|---|---|---|---|---|---|
| Temperatures | | 85° C | 85° C | 85° C | | 40° C | 40° C | 40° C |
| Resin(1.1) maleate isomerized with 1% piperidine | Swelling | 0.12% | 0.24% | 0.58% | 0.57% | 8.62% | 4.65% | 0.7% |
| | Loss in weight | 0.82% | 0.59% | 0.50% | 0.59% | +0.40% | 0.75% | 1.30% |
| | Loss in hardness | +0.8% | +7.7% | +0.3% | 18.4% | 100% | 77.6% | 25.2% |
| | Loss in flexion 45.9% | 14.3% | 42% | 17.7% | 30.5% | 27.2% | 15% | |

TABLE II

Resistance of the Copolymerizates to Solvents and Chemical Reagents After One Month of Corrosive Attack

| Solvents | | NaOH at 20% | SO$_4$H$_2$ at 25% | CH$_3$CO$_2$H at 10% | C$_2$H$_5$OH pure | (CH$_3$)$_2$CO at 50% | C$_6$H$_4$Cl pure | C$_6$H$_4$Cl/C Cl$_3$H |
|---|---|---|---|---|---|---|---|---|
| Temperatures | | 85° C | 85° C | 85° C | | 40° C | 40° C | 40° C |
| Resin (2.1) maleate without piperidine | Swelling | 1.58% | 0.05% | 1.59% | 1.76% | 10.48% | Cylinder destroyed | Cylinder destroyed |
| | Loss in weight | +0.15% | 0.46% | 0.24% | 0.37% | +0.39% | Cylinder destroyed | Cylinder destroyed |
| | Loss in hardenss | 45.1% | +1.8% | 25.8% | 67.7% | 100% | Cylinder destroyed | Cylinder destroyed |
| | Loss in flexion | 62.5% | 19% | 50.8% | 35.3% | 61.1% | Cylinder destroyed | Cylinder destroyed |
| Resin (2.2) fumarate | Swelling | −0.03% | 0% | 0.50% | 0.44% | 6.64% | 3.29% | 0.50% |
| | Loss in weight | 0.59% | 0.47% | 0.41% | 0.52% | +0.72% | 0.50% | 1.13% |

TABLE II-continued

Resistance of the Copolymerizates to Solvents and Chemical Reagents After One Month of Corrosive Attack

| Solvents | NaOH at 20% | SO$_4$H$_2$ at 25% | CH$_3$CO$_2$H at 10% | C$_2$H$_5$OH pure | (CH$_3$)$_2$CO at 50% | C$_6$H$_4$Cl pure | C$_6$H$_4$Cl/C Cl$_3$H |
|---|---|---|---|---|---|---|---|
| Temperatures | 85° C | 85° C | 85° C | | 40° C | 40° C | 40° C |
| Loss in hardness | 2.3% | +10.5% | 1% | 13.7% | 100% | 48.4% | 19.1% |
| Loss in flexion | 47.4% | 22.1% | 44.4% | 29.4% | 42.9% | 37.1% | 11% |

We claim:

1. Unsaturated polyesters comprising the reaction product of maleic acid with the polyhalogenated polyphenyl which is itself a reaction product of decachlorodiphenyl with a polyethyleneglycol, the polyesters possessing about 60 to 98% fumaric acid groups and from about 40 to 2% maleic acid groups.

* * * * *

UNITED STATES PATENT AND TRADEMARK OFFICE
CERTIFICATE OF CORRECTION

PATENT NO. : 4,049,628
DATED : September 20, 1977
INVENTOR(S) : Jean Weiss and Alain Zalmanski It is certified that error appears in the above-identified patent and that said Letters Patent are hereby corrected as shown below:

Column 2, Line 5, reads "60 to 90%", should read --60 to 98%--

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*